United States Patent
Bleiweiss

(10) Patent No.: US 10,129,530 B2
(45) Date of Patent: Nov. 13, 2018

(54) VIDEO FEATURE TAGGING

(71) Applicant: Intel Corporation, Santa Clara, CA (US)

(72) Inventor: Amit Bleiweiss, Yad Binyamin (IL)

(73) Assignee: INTEL CORPORATION, Santa Clara, CA (US)

( * ) Notice: Subject to any disclaimer, the term of this patent is extended or adjusted under 35 U.S.C. 154(b) by 290 days.

(21) Appl. No.: 14/865,403

(22) Filed: Sep. 25, 2015

(65) Prior Publication Data

US 2017/0094252 A1 Mar. 30, 2017

(51) Int. Cl.
| | |
|---|---|
| H04N 13/239 | (2018.01) |
| H04N 13/243 | (2018.01) |
| H04N 13/246 | (2018.01) |
| H04N 13/296 | (2018.01) |
| G06K 9/00 | (2006.01) |
| G06K 9/62 | (2006.01) |
| H04N 9/04 | (2006.01) |

(52) U.S. Cl.
CPC ....... H04N 13/239 (2018.05); G06K 9/00375 (2013.01); G06K 9/6262 (2013.01); H04N 9/045 (2013.01); H04N 13/243 (2018.05); H04N 13/246 (2018.05); H04N 13/296 (2018.05); G06K 2209/27 (2013.01)

(58) Field of Classification Search
CPC ............... H04N 13/0239; H04N 9/045; G06K 9/00375; G06K 9/6262
See application file for complete search history.

(56) References Cited

U.S. PATENT DOCUMENTS

| 6,175,644 B1 | 1/2001 | Scola et al. |
| 7,564,990 B2 | 7/2009 | Kern et al. |
| | (Continued) | |

FOREIGN PATENT DOCUMENTS

KR 101441495 B1 9/2014

OTHER PUBLICATIONS

PCT Search Report and Written Opinion for PCT Application PCT/US2016/042451 dated Nov. 3, 2016, 13 pages.

(Continued)

*Primary Examiner* — Nam D Pham
(74) *Attorney, Agent, or Firm* — Finch & Maloney PLLC

(57) ABSTRACT

An activity recording system is provided. The activity recording system includes a three-dimensional camera, a sensor arrangement that is fitted to a subject being recorded, and an activity recording device. The activity recording device receives image information from the three-dimensional camera and sensor arrangement information from the sensor arrangement. Both the image information and the sensor arrangement information include location measurements. The sensor arrangement information is generated by location sensors that are positioned at target features of the subject to be tracked. The sensor arrangement information is a key to the image information that specifies where, in any given image, the target features of the subject lie. Activity data having these characteristics may be applied to solve a variety of system development problems. Such activity data can be used to training machine learning components or test computer vision components for a fraction of the cost of using conventional techniques.

25 Claims, 6 Drawing Sheets

(56) References Cited

U.S. PATENT DOCUMENTS

| | | |
|---|---|---|
| 9,142,024 B2 | 9/2015 | Sullivan et al. |
| 2013/0010079 A1* | 1/2013 | Zhang ............... H04N 13/0207 |
| | | 348/47 |
| 2014/0112574 A1* | 4/2014 | Kim ..................... G06T 7/0018 |
| | | 382/154 |
| 2014/0184745 A1 | 7/2014 | Lv et al. |
| 2016/0343166 A1* | 11/2016 | Inoko ................... G06T 19/006 |

OTHER PUBLICATIONS

Zhang, C and Zhang, Z., "Calibration Between Depth and Color Sensors for Commodity Depth Cameras." Retrieved from the Internet at URL: http://research.microsoft.com/en-us/um/people/chazhang/publications/hot3d11_ChaZhang.pdf on Sep. 14, 2015. 6 pages.

5DT—Fifth Dimension Technologies, downloaded and available from the Internet at URL: http://www.5dt.com/products/pdataglove5u.html on Apr. 14, 2015. 3 pages.

Zhang, C. and Zhang, Z., "Calibration Between Depth and Color Sensors for Commodity Depth Cameras," downloaded and available from the Internet at URL: http://research.microsoft.com/en-us/um/people/chazhang/publications/hot3d11_ChaZhang.pdf on Sep. 24, 2015. 6 pages.

Products—Cyber Glove II, downloaded and available from the Internet at URL: http://cyberglovesystems.com/products/cyberglove-II/overview on Aug. 14, 2015. 1 page.

Wang, R. Y. and Popovic, J, "Real-Time Hand-Tracking with a Color Glove," downloaded and available from the Internet at URL:http://people.csail.mit.edu/rywang/handtracking/ on Sep. 24, 2015. 2 pages.

* cited by examiner

VIDEO FEATURE TAGGING

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Machine learning programs enable robust computer vision applications because, once adequately trained, these programs are able to classify physical features of a subject despite adverse conditions, such as variable subject positions, orientations, and lighting. However, to be adequately trained, many machine learning programs require large sets of validated data. For example, in the context of real-time hand tracking, a machine learning algorithm may require hundreds of validated video frames to be trained adequately. In some instances, to be validated, depth pixels in each of these video frames are manually tagged along the height and width dimensions to specify the locations of fingertips and other important features captured in the frame. In these instances, the metadata generated by this manual tagging process is used in conjunction with the video frames to train a machine learning program to be a classifier of hand positions, orientations, and translations. Unfortunately, this process of manually tagging video frames is labor-intensive, time-consuming, and prone to error. Furthermore, because classifiers are dependent on the specific camera used during training, new validated data must be created each time a new camera is introduced. For these reasons, creation of validated data can be a bottleneck in the development of many computer vision algorithms.

DETAILED DESCRIPTION

Figure 1:
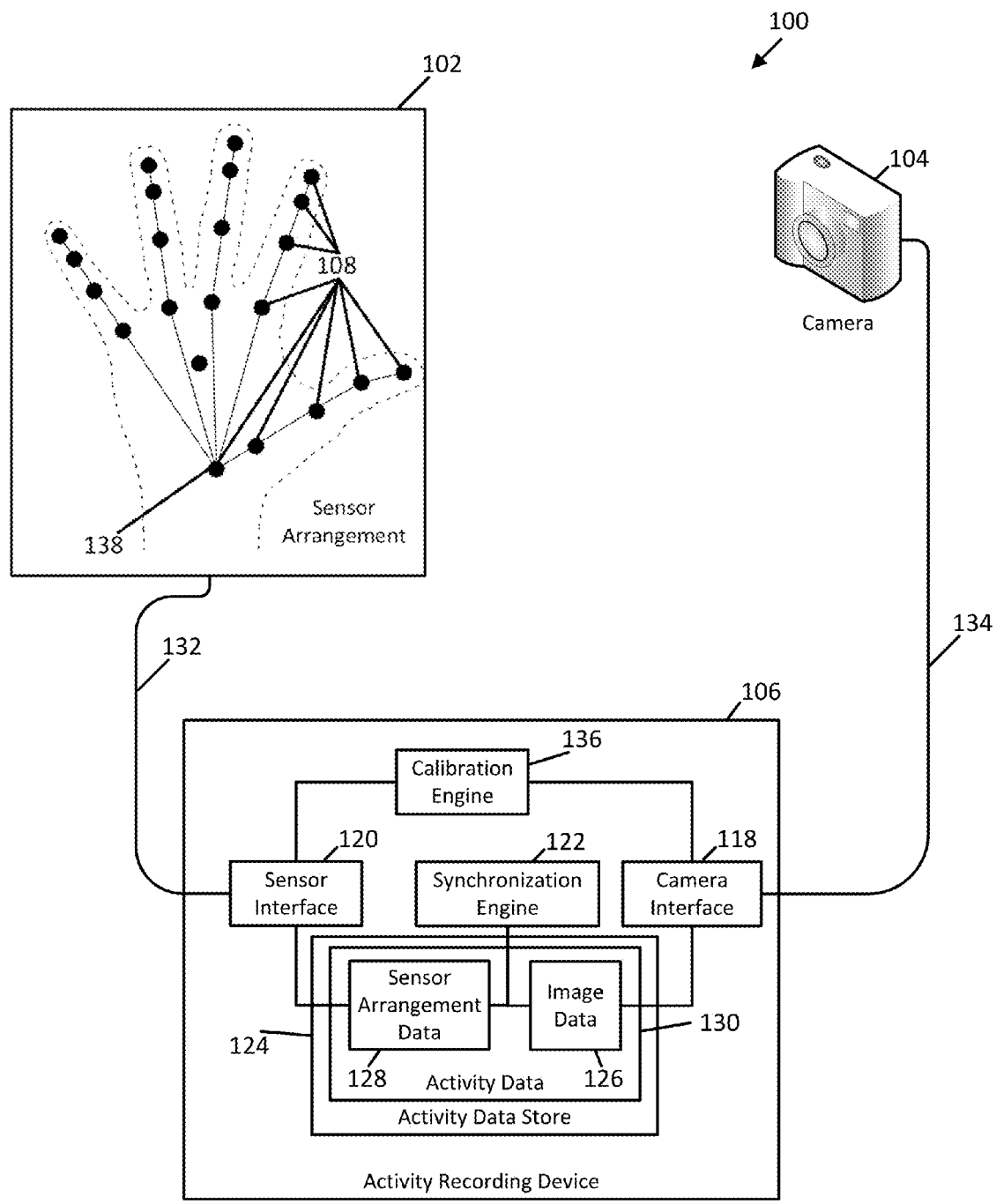
FIG. 1 illustrates an activity recording system configured in accordance with an embodiment of the present disclosure.

Activity recording systems disclosed herein automate the creation of activity data that includes images of a subject that are associated with (e.g., tagged with) precise and accurate location and/or orientation measurements of the subject. The ability to create three-dimensional activity data of this sort differentiates the systems described herein from conventional approaches, such as manual tagging, in which a user identifies the location of a feature only along the height and width dimensions. In some embodiments, the activity recording system includes a three-dimensional camera, a sensor arrangement that is fitted to a subject being recorded, and an activity recording device. The activity recording device receives image information from the three-dimensional camera and sensor arrangement information from the sensor arrangement. Both the image information and the sensor arrangement information include location measurements. However, the sensor arrangement information is generated by sensors that are positioned on the subject relative to target features to be tracked. These target features may be points or regions (e.g., a finger or a hand). Each of the sensors in the sensor arrangement may detect, track, and measure location and/or orientation of the target features within a physical space. Thus, sensor arrangement information is a key to the image information that specifies where, in any given image, the target features of the subject lie. Activity data having these characteristics may be applied to solve a variety of system development problems. For instance, such activity data can be used to training machine learning components or test computer vision components for a fraction of the cost of using conventional techniques.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

As previously explained, conventional techniques for tagging video features can be used to create data that describes locations of target features of a subject, but these techniques have several shortcomings, which are based largely on the fact that the techniques are manual. Two possible approaches are the use of gloves colored to aid in interpreting features of the hand and motion capture gloves. Unfortunately, these approaches also have shortcomings of their own, as will be apparent in light of this disclosure. For example, colored gloves report global translation error of 5-15 cm, which increases as the hand moves further away from the camera. In addition, colored gloves, which are often formed of latex, have an adverse impact on the infrared information acquired by three-dimensional cameras. Colored gloves also have an adverse impact on the RGB information acquired by cameras since, under normal operating conditions, hands will not have the complex color schemes exhibited by the colored gloves. Thus the use of colored gloves is often associated with training errors in machine learning algorithms. Motion capture gloves are also not suitable for video feature tagging because these gloves transmit rotational information rather than positional information and, therefore, cannot provide positional information regarding some anatomical features of the hand (e.g., the fingertips). In addition, the material of motion capture gloves is opaque, and their use causes training errors in machine learning algorithms.

Thus, and in accordance with some embodiments of the present disclosure, activity recording devices and systems are provided that generate activity data in which image data is associated (e.g., tagged) with location and/or orientation measurements of a subject's target features. Such activity recording devices and systems differ from conventional approaches to video feature tagging at least in that the activity recording devices and systems automatically create activity data that associates the image data with location and/or orientation measurements of a subject's target features. In one embodiment, the activity recording devices and systems automatically tag features during the video recording process. In this embodiment, the system utilizes a combination of small magnetic sensors, which are fitted to the subject prior to the recording process, and a three-dimensional camera to generate accurate tags that remove the need for manual tagging. The activity data generated by the system in this embodiment is suitable for use with any computer vision component. It is appreciated that while many of the examples discussed herein focus on hand tracking, the techniques described herein may be applied to automatically tag features of any object.

In some embodiments, the activity recording system includes an activity recording device in data communication with a three-dimensional camera and an arrangement of sensors configured to detect location and/or orientation within a physical space. Each of the sensors in the arrangement is positioned to enable recordation of one or more target features of a subject. Further, in some embodiments, each of the sensors is attached to the subject using visually unobtrusive components (e.g., clear tape). Such unobtrusive components minimize any visual artifacts that may be generated by the sensor arrangement.

In some embodiments, prior to starting a recording session, the activity recording device calibrates initial information received from the sensor arrangement to initial information received from the camera. Such calibration activities are described further below.

In some embodiments, during a recording session, the activity recording device receives image information from the camera and sensor arrangement information from the sensor arrangement. In these embodiments, the activity recording device stores image data based on the image information received and sensor arrangement data based on the sensor arrangement information received in data store. Next, the activity recording device synchronizes and associates the sensor arrangement data with the image data. Where the sampling rate of the sensor arrangement and the camera differ, the activity recording device may calculate fabricated sensor readings, as described further below.

After the image data is synchronized and associated with the sensor arrangement data, the resulting activity data may be used by other computing systems to test and train computer vision components and machine learning components. Systems configured to execute these processes are described further below.

System Architecture

FIG. 1 illustrates one example embodiment of an activity recording system 100 that is configured to create synchronized, calibrated activity data using information received via two distinct channels. The system 100 may be implemented using one or more computing systems, such as may be fabricated using any of the components of the systems described below with reference to FIGS. 6 and 7. As shown in FIG. 1, the system 100 includes a sensor arrangement 102, a camera 104, and an activity recording device 106. In some embodiments, the camera 104 is a three-dimensional or depth camera. As shown, the activity recording device 106 is coupled to the sensor arrangement 102 via a data connection 132 and coupled to the camera 104 via a data connection 134. As described further below, the activity recording device 106 exchanges location and/or orientation information with the sensor arrangement 102 via the data connection 132 and exchanges image information with the camera 104 via the data connection 134.

As shown in FIG. 1, the sensor arrangement 102 includes one or more sensors 108. Each of the sensors 108 is configured to measure location and/or orientation within a physical space. The one or more sensors 108 may include a palm sensor 138. In various embodiments, each of the one or more sensors 108 is configured to acquire and transmit data descriptive of physical location and/or orientation. A variety of sensors may be employed for this purpose, including accelerometers, gyroscopes, magnetometers, and the like. In at least one embodiment, each of the sensors 108 includes an accelerometer and a gyroscope, providing for a 6 degrees of freedom sensor. In some embodiments, each of the sensors 108 is small enough (e.g., approximately 1 mm) to avoid creating artifacts in image features captured by the camera 104, regardless of whether those image features are captured via visible light, infrared waves, or other electromagnetic radiation. In at least one embodiment, each of the sensors 108 is included in a commercially available tracking system, such the trakSTAR™ tracking system commercially available from Ascension Technology Corporation of Shelburne, Vt.

Figure 2:
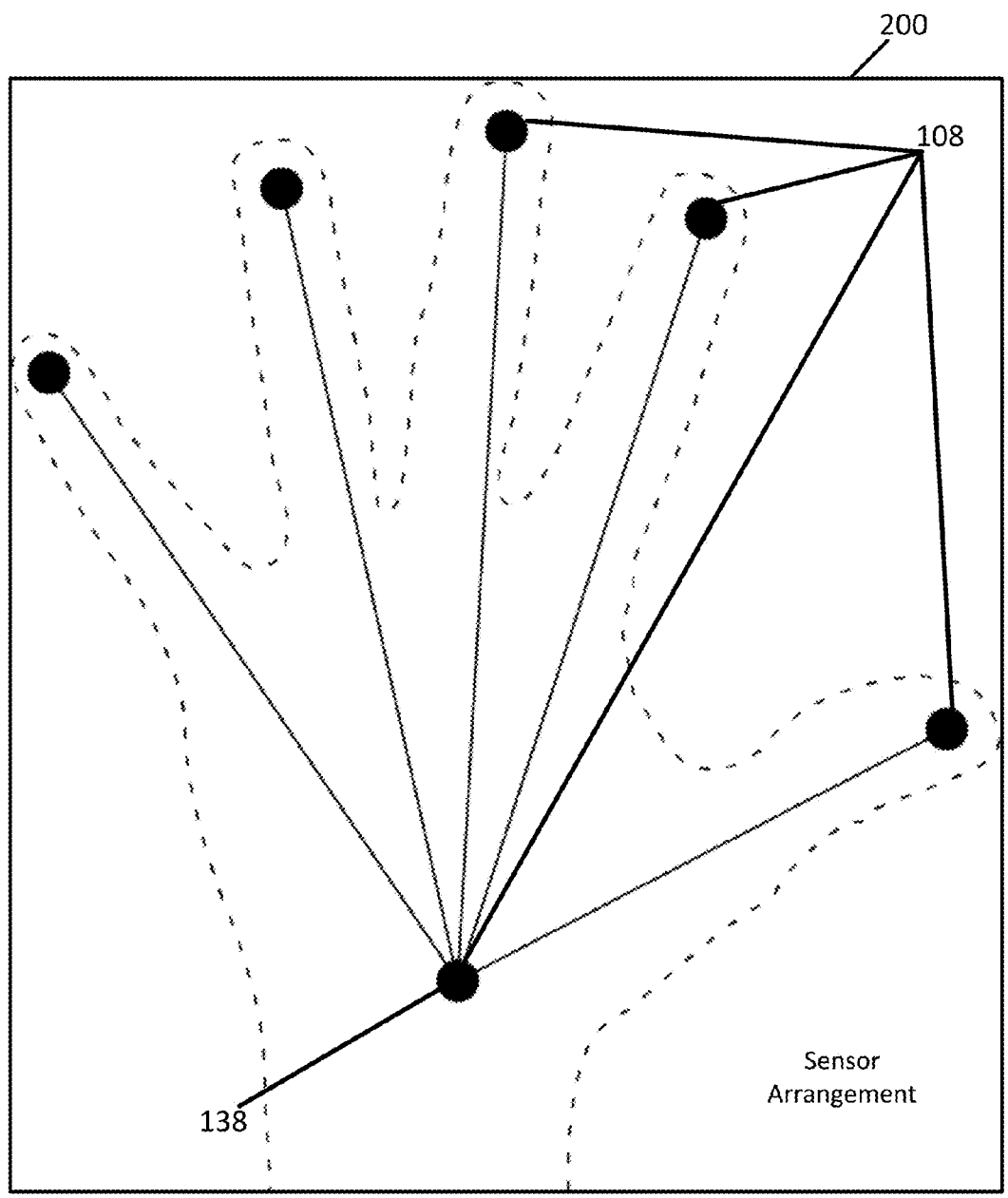
FIG. 2 illustrates a sensor arrangement configured in accordance with an embodiment of the present disclosure.

As shown in FIG. 1, the sensor arrangement 102 includes 22 sensors 108 positioned at various locations about a human hand. As illustrated, these locations are generally positioned near joints to enable to the sensor arrangement 102 to capture location and/or orientation information descriptive of the each portion of the hand capable of substantially isolated movement as well as overall movement of the hand. FIG. 2 illustrates another sensor arrangement 200 that may be used in place of or in addition to the sensor arrangement 102 in some embodiments. As shown, the sensor arrangement 102 includes 6 sensors 108. One of the 6 sensors is positioned near the center of the palm of the hand and the remaining 5 are positioned near the fingertips to enable the sensor arrangement 102 to capture location and/or orientation information descriptive of the fingers relative to the palm of the hand as well as overall movement of the hand.

As described further below, in some embodiments, the sensor arrangement 102 is housed within a glove. This glove may be fabricated from transparent materials, such as translucent fabric or clear vinyl, to prevent the glove from interfering with location information generate by the camera 104, where, for example, the camera using infrared waves to detect location.

While the sensor arrangements 102 and 200 are configured to capture hand location and/or orientation, it is appreciated that other sensor arrangements may be configured to capture location and/or orientation of other anatomical features (e.g., the head, arms, legs, full body, etc.). In addition, it is appreciated that other sensor arrangements may be configured to capture locations and/or orientations of other animals, such as common pets, guide dogs, exotic animals, and the like. It is also appreciated that other sensor arrangements may be configured to capture locations and/or orientations of other moving objects, such as drones, cars, boats, and the like. These and other sensor arrangements may be used in accord with various embodiments to generate activity data, such as the activity data 130.

In some embodiments, the activity recording device 106 is implemented using a computing system, such as one of the computing systems described further below with reference to FIGS. 6 and 7. The activity recording device 106 includes several specialized components that collective create calibrated, synchronized activity data 130 useful for a variety of applications, some of which are described further below with reference to FIGS. 4 and 5. As shown, the activity recording device 106 includes a sensor interface 120, a synchronization engine 122, a calibration engine 136, a camera interface 118, and an activity data store 124. The activity data store 124 includes the synchronized activity data 130 which, in turn, includes image data 126 and sensor arrangement data 128.

As illustrated in FIG. 1, the sensor interface 120 is configured to receive information descriptive of physical location and/or orientation from the sensors 108 via the data connection 132. In some embodiments, the sensor interface 120 is also configured to process the received location and/or orientation information and store the processed information in the activity data store as the sensor arrangement data 128. The processing that the sensor interface 120 is configured to perform may include monitoring a system clock implemented by the activity recording device 106 and storing a current time stamp in association with each sensor reading as the reading is received.

As shown in FIG. 1, the camera interface 118 is configured to receive information descriptive of a plurality of images (e.g., video frames) from the camera 104 via the data connection 134. In some embodiments, the camera interface 118 is also configured to process the received information and store the processed information in the activity data store as the image data 126. The processing that the camera interface 118 is configured to perform may include monitoring a system clock implemented by the activity recording device 106 and storing a current time stamp in association with each image as the image is received.

As illustrated in FIG. 1, the calibration engine 136 is configured to receive initial image information from the camera interface 118 and initial sensor arrangement information from the sensor interface 120. In some embodiments, the calibration engine 136 is also configured to generate calibration data using the initial image information and the initial sensor arrangement information. When executing according to its configuration in some embodiments, the calibration engine may generate and store the calibration data as part of the activity data 130 in the activity data store 124. The calibration data specifies a relationship between location measurements made by the camera 104 and location measurements made by the sensors 108 of sensor arrangement 102. The calibration data may be used by components accessing the activity data 130 to reconcile location measurements in the sensor arrangement data 128 and the image data 126 to a common frame of reference. For example, either or both of the sensor interface 120 and camera interface 118 may be configured to use the calibration data to reconcile location information in the image information with location information in the sensor arrangement information and store the reconciled location information in the activity data store 124. Alternatively the sensor interface 120 and/or the camera interface 118 may transmit calibration data back to the sensor arrangement 102 and/or the camera 104 so that both of these devices transmit location information using a common frame of reference. In another embodiment, other components (e.g., the synchronization engine 122) that access the activity data 130 may access the calibration data to calculate interpretations of the sensor arrangement data 128 that spatially match interpretations of the image data 126 where the image data 126 and the sensor arrangement data 128 depict the same physical location.

In one embodiment, the calibration engine 136 generates calibration data by comparing a first location of a reference point specified by the initial image information to a second location of the reference point specified by the initial sensor arrangement information. The reference point may be, for example, the location of a sensor 108 positioned in the center of a palm of a hand presented to the camera 104. Where the first location does not equal the second location, calibration information is required to provide a common frame of reference between the sensor arrangement 102 and the camera 104. In this instance, the calibration engine 136 calculates a difference between the first location and the second location and stores the difference as calibration data for use by other components of the activity recording system 100.

As shown in FIG. 1, the synchronization engine 122 is configured to synchronize the image data 126 with the sensor arrangement data 128. Such synchronization may be required where, for example, the sampling frequency of the sensor arrangement 120 differs from the sampling frequency of the camera 104. When executing according to this configuration in some embodiments, the synchronization engine 122 identifies a set of sensor readings that correspond temporally to each image of the image data 126. This set of sensor readings may include a reading for each sensor 108, some minimum number of sensor readings, or readings for, at least, some identified subset of the sensors 108. In one embodiment, the synchronization engine 122 identifies a set of sensor readings for an image by reading a time stamp associated with the image and attempting to find one or more matching time stamps in the time stamps associated with the sensor arrangement data 128. In some embodiments, the synchronization engine 122 identifies a matching time stamp where a time stamp associated with the sensor arrangement data 128 is within a configurable threshold value of a time stamp associated an image of the image data 126. Where matching time stamps for one or more sensor readings of the set of sensor readings are not identified, the synchronization engine 122 may calculate one or more fabricated sensor readings to complete the set of sensor readings. The synchronization engine may calculate fabricated sensor readings using any of a variety of value estimation techniques. For instance, in one embodiment, the synchronization engine 122 calculates a fabricated sensor reading by interpolating a value based on two sensor readings associated with time stamps closest to the time stamp associated with the image being synchronized. Regardless of the value estimation technique used, the synchronization engine 122 stores fabricated sensor readings and associations between each image and its corresponding set of actual and/or fabricated sensor readings in the activity data 130.

Other synchronization techniques may be implemented without departing from the scope of the present disclosure. For instance, some embodiments may use time stamps that originate from the camera 104 and/or the sensor arrangement 102 in place of the time stamps that originate from the activity recording device 106 as the basis for the synchronization processes described above. Other embodiments may synchronize the sensor arrangement data 128 directly to the image data 126 by creating associations between each received sensor reading and a current image (e.g., the image last received when the sensor reading is received). In another embodiment, the camera 104 and/or the sensor arrangement 102 are synchronized with the activity recording device 106 in hardware (e.g., via a connection of a microcontroller). Thus, the embodiments disclosed herein are not limited to a particular synchronization data or synchronization technique.

Methodology

Figure 3:
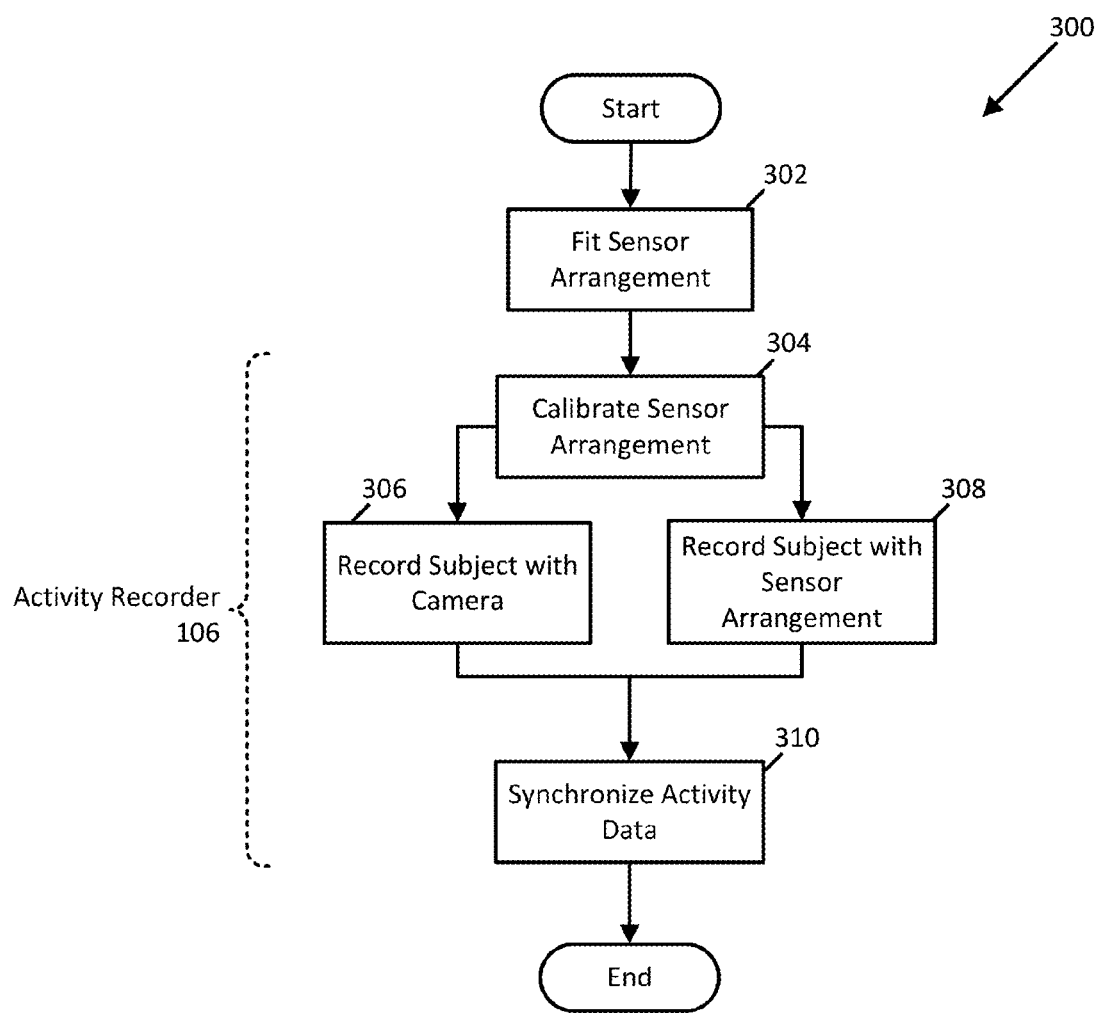
FIG. 3 illustrates an activity recording process in accordance with an embodiment of the present disclosure.

According to some embodiments, an activity recording system (e.g., the activity recording system 100) executes processes that generate activity data. FIG. 3 illustrates a data generation process 300 in accord with these embodiments. As shown in FIG. 3, the detection process 300 includes several acts that, in combination, enable the activity recording system to efficiently generate activity data that can be used to train classifiers and test other computer vision programs.

In act 302, a subject (e.g., a human hand) is fitted with a sensor arrangement (e.g., the sensor arrangement 102) that is connected to an activity recording device (e.g., the activity recording device 106). For example, in some embodiments, this fitting process may include affixing sensors (e.g., the sensors 108) to a subject using adhesive, such as medical tape, transparent tape, or the like. In other embodiments, this fitting process may include placing a transparent glove or some other transparent garment housing the sensors on the subject. Next, the activity recording system is powered on and the subject is placed in clear view of a camera (e.g., the camera 104) that is connected to the activity recording device.

In act 304, the activity recording device calibrates the sensor arrangement to camera by executing a calibration engine (e.g., the calibration engine 136). In some embodiments, the calibration engine generates calibration data that can be used to match a location measured by a palm sensor (e.g., the palm sensor 138) to a location of the palm sensor measured by the camera. The calibration engine stores the calibration data within activity data (e.g., the activity data 130). The calibration data may be used by components that generate location measurements or access the activity data to spatially reconcile location measurements in sensor arrangement data (e.g., the sensor arrangement data 128) to location measurements in image data (e.g., the image data 126). Examples of the components that generate location measurements or access the activity data, according to some embodiments, include the sensor arrangement, the camera, a sensor interface (e.g., the sensor interface 120), a synchronization engine (e.g., the synchronization engine 122), a camera interface (e.g., the camera interface 118), and other components.

In act 306, the activity recording device records the subject via a first channel by receiving, via the camera interface, image information depicting the subject, processing the image information as described above, and storing the processed image information as the image data. In act 308, the activity recording device also records the subject via a second channel by receiving, via the sensor interface, sensor arrangement information depicting the subject, processing the sensor arrangement information as described above, and storing the processed sensor arrangement information as the sensor arrangement data.

In act 310, the activity record synchronizes the first channel to the second channel by executing the synchronization engine. As described above, in some embodiments, the synchronization engine identifies a set of sensor readings that correspond temporally to each image of the image data. Further, the synchronization engine may calculate one or more fabricated sensor readings to include in one or more of these sets of sensor readings as needed to complete each set of sensor readings. After the act 310, the data generation process ends.

Processes in accord with the data generation process 300 enable activity recording systems to generate activity data that accurate tracks the movement of a subject. Processes in accord with the data generation process 300 can be used to iteratively create, for example, a database of gesture data in which each member is a distinct gesture targeted for identification by a computer vision component. Thus, the activity data can be advantageously used to configured and/or test by other components and systems, such as the systems described further below with reference to FIGS. 4 and 5.

Example Training System

Figure 4:
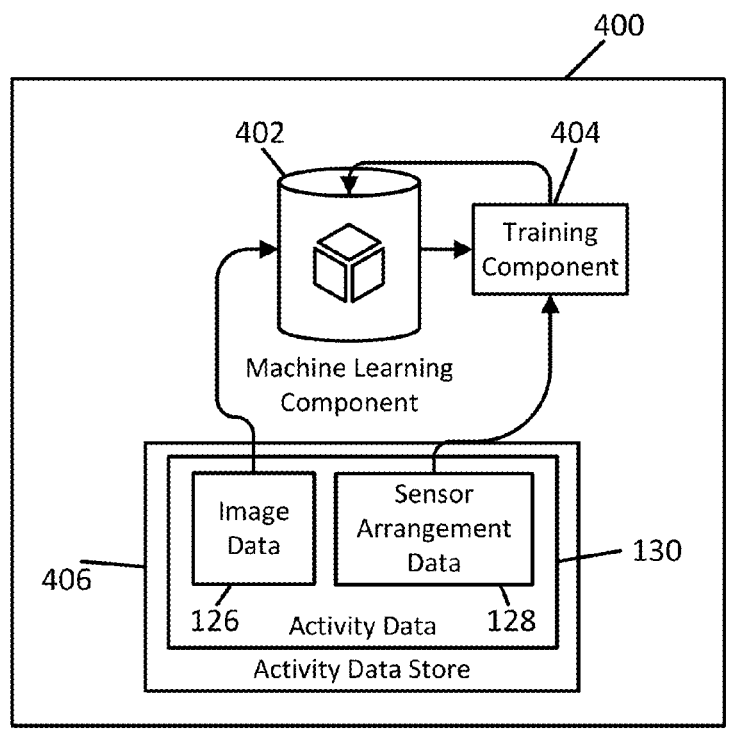
FIG. 4 illustrates a training system configured in accordance with an embodiment of the present disclosure.

FIG. 4 illustrates one example of a training system 400 that is configured to train a machine learning component to operate as a classifier using activity data (e.g., the activity data 130). The system 400 may be implemented using one or more computing systems, such as may be fabricated using any of the components of the systems described below with reference to FIGS. 6 and 7. As shown in FIG. 4, the system 400 includes a machine learning component 402, a training component 404, and an activity data store 406 storing the activity data 130. The machine learning component 402 maybe any of a variety of machine learning components, such as a support vector machine, a random forest process, a neural network, or the like.

In some embodiments in accord with FIG. 4, the machine learning component 402 is configured to receive and classify image data (e.g., the image data 126) as being an instance of a class. For example, the machine learning component 402 may be configured to classify each finger depicted in the image data as being, for example, a thumb, index finger, middle finger, ring finger, or pinky. In other embodiments, the machine learning component 402 may be configured to classify the image data into positive and negative sets answering the query: "Does the gesture in the image data show the back of the hand?"

To be able to perform accurate classification, the machine learning component 402 must be adequately trained. The training component 404 is configured to train the machine learning component 402 using the image data and sensor arrangement data (e.g., the sensor arrangement data 128). When executing according to this configuration, the machine learning component 402 executes an iterative training process until some set of convergence criteria are satisfied. In each iteration of this training process the machine learning component 402 receives image data as input and generates output classifying the image data. Also within each iteration of the training process, the training component receives the output and calculates an amount of error in the classification using the sensor arrangement data. If the amount of error meets the convergence criteria, the training component 404 terminates the training process. If the amount of error does not meet the convergence criteria, the training component 404 adjusts the machine learning component 402 in an attempt to decrease the amount of error in the next iteration and initiates the next iteration.

Example Testing System

Figure 5:
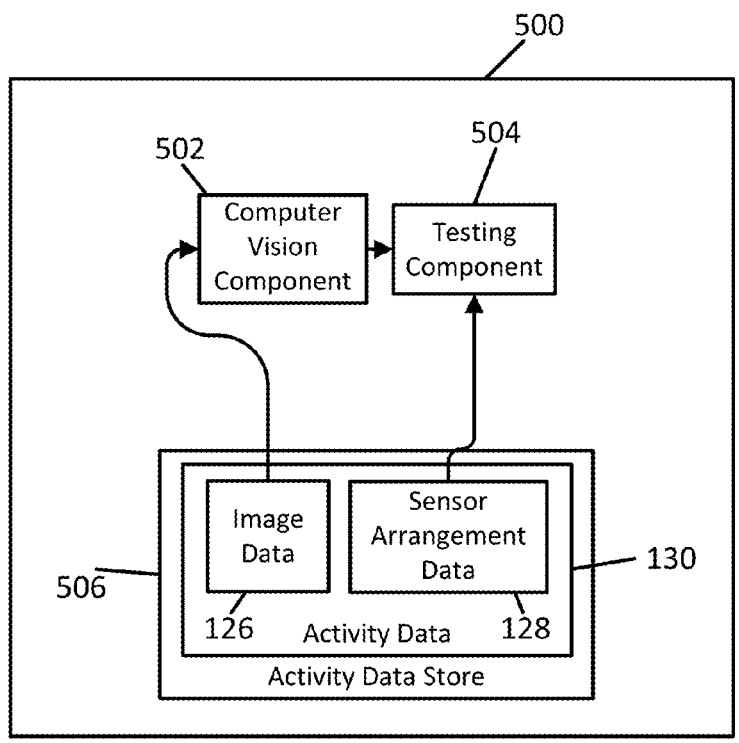
FIG. 5 illustrates a testing system configured in accordance with an embodiment of the present disclosure.

FIG. 5 illustrates one example of a testing system 500 that is configured to test operation of a computer vision component 502 using activity data (e.g., the activity data 130). The system 500 may be implemented using one or more computing systems, such as may be fabricated using any of the components of the systems described below with reference to FIGS. 6 and 7. As shown in FIG. 5, the system 500 includes a computer vision component 502, a testing component 504, and an activity data store 506 storing the activity data 130. The computer vision component 402 maybe any of a variety of computer vision components that track and processes image data (e.g., the image data 126).

In some embodiments in accord with FIG. 5, the computer vision component 502 is configured to receive image data and track targeted feature points within the image data. For example, the computer vision component 502 may be configured to track each finger depicted in the image data and identify gestures made by the hand as a whole. When executing in debug mode, the computer vision component 402 generates an output file that includes tracking data. In some embodiments, this tracking data includes location and/or orientation measurements of each anatomical feature tracked as determined by the computer vision component 402 from the image data.

To ensure that the computer vision component 502 is tracking the anatomical features correctly, the testing component 504 is configured to receive the output file, compare the location measurements in the output file to corresponding location measurements in sensor arrangement data (e.g., the sensor arrangement data 130), and calculate any differences between the location measurements in the output file and the location measurements in sensor arrangement data. In some embodiments, these differences are summarized to provide an overall assessment of the quality of the computer vision component. For instance, the testing component may be configured to calculate an average difference over all frames in the image data. These differences and summaries may be reported to a test engineer who may analyze them further prior to providing the test data and comments to developers of the computer vision component 502.

Information within the systems disclosed herein may be stored in any logical and physical construction capable of holding information on a computer readable medium including, among other structures, linked lists, file systems, flat files, indexed files, hierarchical databases, relational databases or object oriented databases. The data may be modeled using unique and foreign key relationships and indices. The unique and foreign key relationships and indices may be established between the various fields and tables to ensure both data integrity and data interchange performance.

Information may flow between the components disclosed herein using a variety of techniques. Such techniques include, for example, passing the information over a network using a variety of standards, such as BLUETOOTH, WiFi, USB, TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Each of the processes disclosed herein depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely an activity recording system, a training system, or a testing system configured according to the examples and embodiments disclosed herein.

Example System

Figure 6:
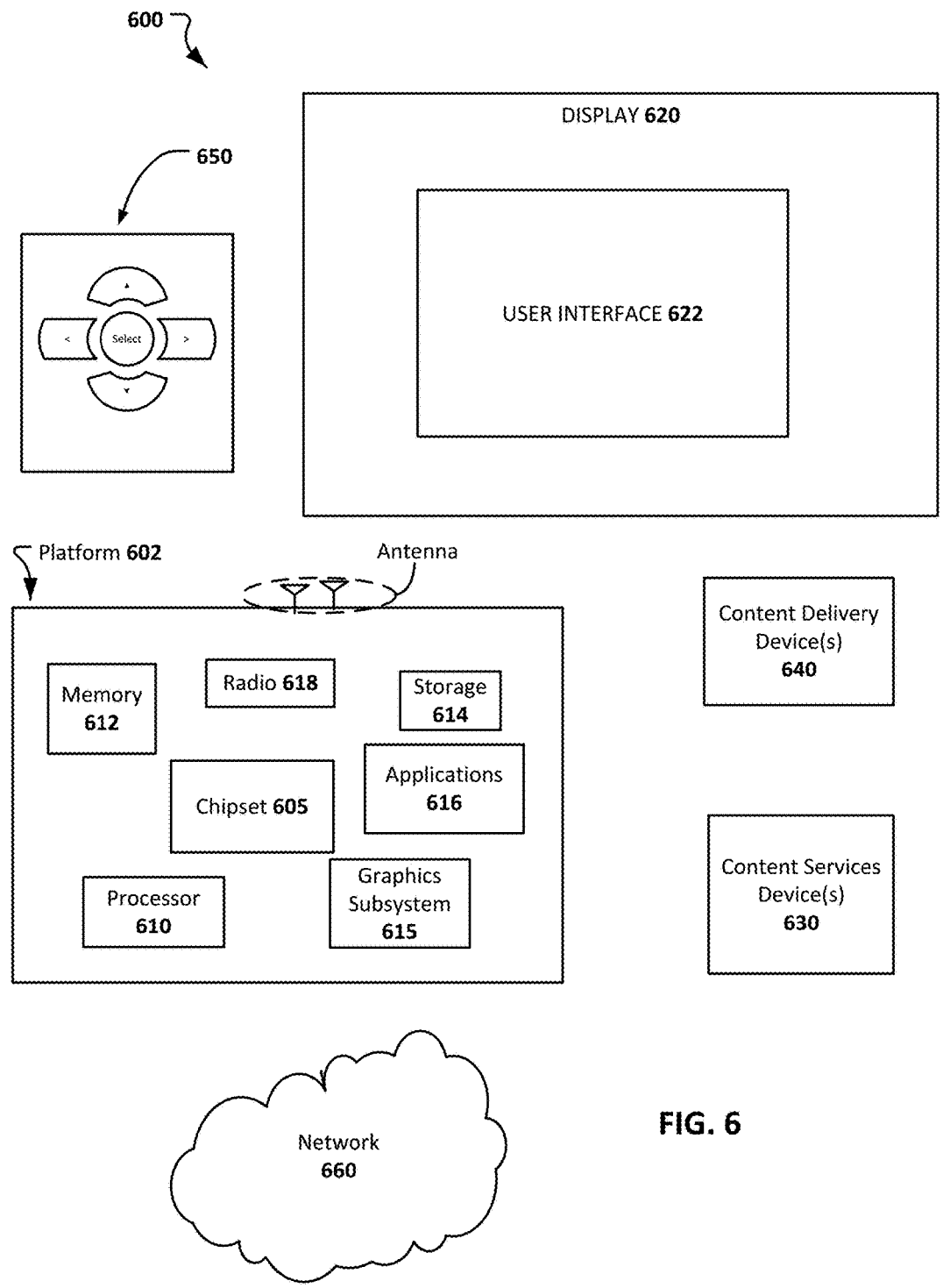
FIG. 6 illustrates a computing system configured in accordance with an embodiment of the present disclosure.

FIG. 6 illustrates a computing system 600 configured in accordance with an embodiment of the present disclosure. In some embodiments, system 600 may be a computing system for detecting activity of subjects although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Thus processor 610 may be implemented with a general purpose processor. However, when executing a specific software process as provided herein, the processor 610 becomes a special purpose processor capable of making specific logic-based determinations based on input data received, and further capable of providing one or more outputs that can be used to control or otherwise inform subsequent processing to be carried out by the processor 610 and/or other processors or circuitry with which processor 610 is communicatively coupled. Thus, the processor 610 reacts to specific input stimulus in a specific way and generates a corresponding output based on that input stimulus. In this sense, the structure of processor 610 according to one embodiment is defined by the processes that it executes. In some example cases, the processor 610 proceeds through a sequence of logical transitions in which various internal register states and/or other bit cell states internal or external to the processor 610 may be set to logic high or logic low. This specific sequence of logic transitions is determined by the state of electrical input signals to the processor 610 and, consequently, a special-purpose structure is effectively assumed by the processor 610 when executing software instructions. Specifically, the instructions anticipate the various stimulus to be received and change the implicated memory states accordingly. In this way, the processor 610 may generate and store or otherwise provide useful output signals. Thus, it is appreciated that the processor 610, during execution of a software process becomes a special purpose machine, capable of processing only specific input signals and rendering specific output signals based on the one or more logic decisions performed during execution of each software instruction. As referred to herein, the processor 610 is configured to execute a function where software is stored in a data store coupled to the processor 310 that is configured to cause the processor to proceed through a sequence of various logic decisions that result in the function being executed.

Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display or other computations. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional)

data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. Other examples of mobile computing devices include robots and drones. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 7:
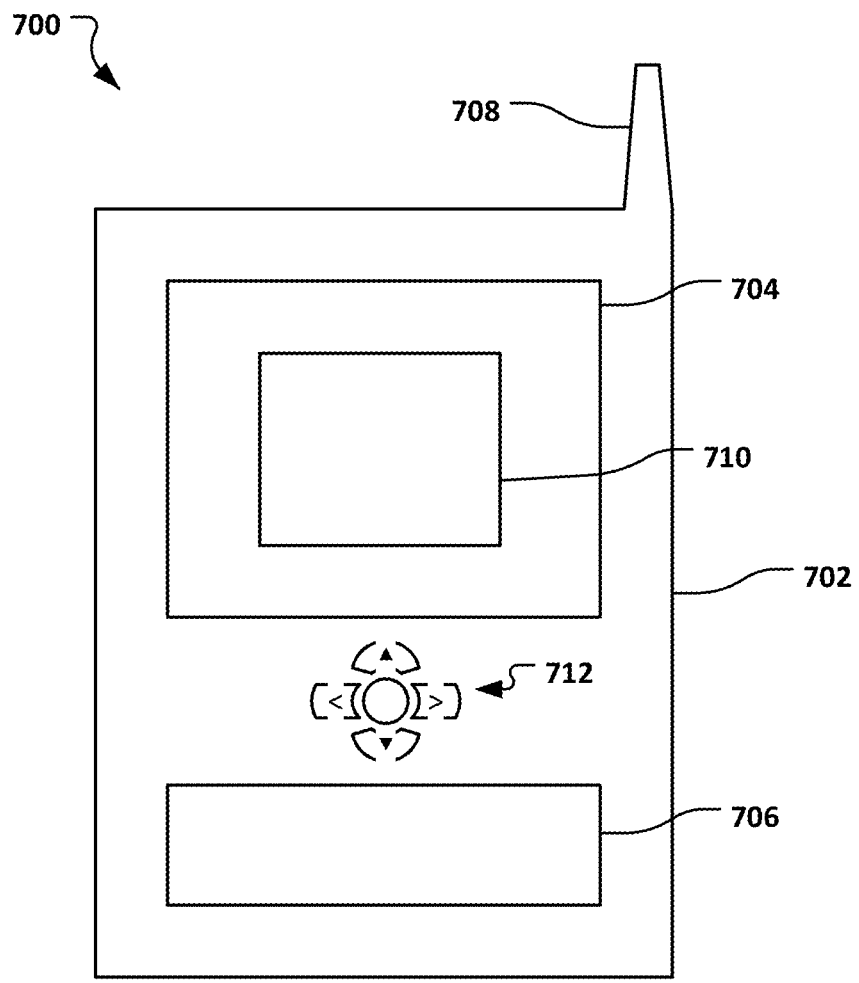
FIG. 7 illustrates a mobile computing system configured in accordance with an embodiment of the present disclosure.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is an activity recording system comprising an activity recording device including: a memory; and at least one processor coupled to the memory and configured to receive image information indicating at least one first three-dimensional measurement of at least one location of a subject; receive sensor arrangement information indicating at least one second three-dimensional measurement of the at least one location of the subject; and store at least one association between the at least one first three-dimensional measurement and the at least one second three-dimensional measurement.

Example 2 includes the subject matter of Example 1, wherein the image information depicts a human hand including one or more fingers and the at least one location includes one or more locations of the one or more fingers.

Example 3 includes the subject matter of either Example 1 or Example 2, wherein the at least one processor is further configured to store, in the memory, image data based on the image information; store, in the memory, sensor arrangement data based on the sensor arrangement information; and synchronize the sensor arrangement data to the image data.

Example 4 includes the subject matter of Example 3, wherein the at least one processor is further configured to synchronize the sensor arrangement data to the image data at least in part by being configured to generate one or more fabricated sensor readings.

Example 5 includes the subject matter of any of the preceding Examples, wherein the at least one processor is further configured to receive initial image information; receive initial sensor arrangement information; and calibrate the initial sensor arrangement information to the initial sensor arrangement information.

Example 6 includes the subject matter of any of the preceding Examples, further comprising a three-dimensional camera in data communication with the activity recording system.

Example 7 includes the subject matter of any of the preceding Examples, further comprising a sensor arrangement in data communication with the activity recording system.

Example 8 includes the subject matter of Example 7, wherein the sensor arrangement includes 22 sensors.

Example 9 includes the subject matter of Example 7, wherein the sensor arrangement includes 6 sensors.

Example 10 includes the subject matter of any of Examples 7 through Example 9, wherein the sensor arrangement is included in a transparent garment.

Example 11 includes the subject matter of Example 10, wherein the transparent garment includes a glove.

Example 12 is a method of recording activity using a device, the method comprising: receiving image information indicating at least one first three-dimensional measurement of at least one location of a subject; receiving sensor arrangement information indicating at least one second three-dimensional measurement of the at least one location of the subject; and storing at least one association between the at least one first three-dimensional measurement and the at least one second three-dimensional measurement.

Example 13 includes the subject matter of Example 12, wherein receiving the image information includes receiving image information depicting a human hand including one or more fingers and indicating one or more locations of the one or more fingers.

Example 14 includes the subject matter of either Example 12 or Example 13, further comprising storing, in the memory, image data based on the image information; storing, in the memory, sensor arrangement data based on the sensor arrangement information; and synchronizing the sensor arrangement data to the image data.

Example 15 includes the subject matter of Example 14, wherein synchronizing the sensor arrangement data to the image data includes to generating one or more fabricated sensor readings.

Example 16 includes the subject matter of either Example 14 or Example 15, further comprising training a machine learning component with the image data, the sensor arrangement data, and the at least one association.

Example 17 includes the subject matter of any of Examples 14 through 16, further comprising testing a computer vision component with the image data, the sensor arrangement data, and the at least one association.

Example 18 includes the subject matter of any of Examples 12 through 17, further comprising receiving initial image information; receiving initial sensor arrangement information; and calibrating the initial sensor arrangement information to the initial sensor arrangement information.

Example 19 includes the subject matter of any of Examples 12 through 18, wherein receiving the image information includes receiving image information from a three-dimensional camera.

Example 20 includes the subject matter of any of Examples 12 through 19, wherein receiving the sensor arrangement information includes receiving sensor arrangement information from 22 sensors.

Example 21 includes the subject matter of any of Examples 12 through 19, wherein receiving the sensor arrangement information includes receiving sensor arrangement information from 6 sensors.

Example 22 is a non-transient computer program product encoded with instructions that when executed by one or more processors cause a process for recording activity to be carried out, the process comprising: receiving image information indicating at least one first three-dimensional measurement of at least one location of a subject; receiving sensor arrangement information indicating at least one second three-dimensional measurement of the at least one location of the subject; and storing at least one association between the at least one first three-dimensional measurement and the at least one second three-dimensional measurement.

Example 23 includes the subject matter of Example 22, wherein receiving the image information includes receiving image information depicting a human hand including one or more fingers and indicating one or more locations of the one or more fingers.

Example 24 includes the subject matter of either Example 22 or Example 23, the process further comprising storing, in the memory, image data based on the image information; storing, in the memory, sensor arrangement data based on the sensor arrangement information; and synchronizing the sensor arrangement data to the image data.

Example 25 includes the subject matter of Example 24, wherein synchronizing the sensor arrangement data to the image data includes to generating one or more fabricated sensor readings.

Example 26 includes the subject matter of either Example 24 or Example 25, the process further comprising training a machine learning component with the image data, the sensor arrangement data, and the at least one association.

Example 27 includes the subject matter of any of Examples 24 through 26, the process further comprising testing a computer vision component with the image data, the sensor arrangement data, and the at least one association.

Example 28 includes the subject matter of any of Examples 22 through 27, the process further comprising receiving initial image information; receiving initial sensor arrangement information; and calibrating the initial sensor arrangement information to the initial sensor arrangement information.

Example 29 includes the subject matter of any of Examples 22 through 28, wherein receiving the image information includes receiving image information from a three-dimensional camera.

Example 30 includes the subject matter of any of Examples 22 through 29, wherein receiving the sensor arrangement information includes receiving sensor arrangement information from 22 sensors.

Example 31 includes the subject matter of any of Examples 22 through 29, wherein receiving the sensor arrangement information includes receiving sensor arrangement information from 6 sensors.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An activity recording system comprising an activity recording device including:
   a memory; and
   at least one processor coupled to the memory and configured to:
      receive image information comprising at least one first three-dimensional measurement of at least one location of a subject;
      receive sensor arrangement information comprising at least one second three-dimensional measurement of at least one sensor positioned on the subject at the at least one location; and
      store at least one association between the at least one first three-dimensional measurement and the at least one second three-dimensional measurement.

2. The activity recording system of claim 1, wherein the image information depicts a human hand including one or more fingers and the at least one location includes one or more locations of the one or more fingers.

3. The activity recording system of claim 1, wherein the at least one processor is further configured to:
   store, in the memory, image data based on the image information;
   store, in the memory, sensor arrangement data based on the sensor arrangement information; and
   synchronize the sensor arrangement data to the image data.

4. The activity recording system of claim 3, wherein the at least one processor is further configured to synchronize the sensor arrangement data to the image data at least in part by being configured to generate one or more fabricated sensor readings.

5. The activity recording system of claim 1, wherein the at least one processor is further configured to:
   receive initial image information;
   receive initial sensor arrangement information; and
   generate calibration data using the initial image information and the initial sensor arrangement information.

6. The activity recording system of claim 1, further comprising a three-dimensional camera configured to communicate data with the activity recording system.

7. The activity recording system of claim 1, further comprising a sensor arrangement configured to communicate data with the activity recording system, the sensor arrangement comprising the at least one sensor.

8. The activity recording system of claim 7, wherein the sensor arrangement includes 22 sensors.

9. The activity recording system of claim 7, wherein the sensor arrangement includes 6 sensors.

10. A method of recording activity using a device, the method comprising:
    receiving image information comprising at least one first three-dimensional measurement of at least one location of a subject;

receiving sensor arrangement information comprising at least one second three-dimensional measurement of at least one sensor positioned on the subject at the at least one location; and storing at least one association between the at least one first three-dimensional measurement and the at least one second three-dimensional measurement.

11. The method of claim 10, wherein receiving the image information includes receiving image information depicting a human hand including one or more fingers and indicating one or more locations of the one or more fingers.

12. The method of claim 10, further comprising:
storing, in a memory of the device, image data based on the image information;
storing, in the memory, sensor arrangement data based on the sensor arrangement information; and
synchronizing the sensor arrangement data to the image data.

13. The method of claim 12, wherein synchronizing the sensor arrangement data to the image data includes to generating one or more fabricated sensor readings.

14. The method of claim 12, further comprising training a machine learning component with the image data, the sensor arrangement data, and the at least one association.

15. The method of claim 12, further comprising testing a computer vision component with the image data, the sensor arrangement data, and the at least one association.

16. The method of claim 10, further comprising:
receiving initial image information;
receiving initial sensor arrangement information; and
generating calibration data using the initial image information and the initial sensor arrangement information.

17. The method of claim 10, wherein receiving the image information includes receiving image information from a three-dimensional camera.

18. A non-transitory computer program product encoded with instructions that when executed by one or more processors cause a process for recording activity to be carried out, the process comprising:
receiving image information comprising at least one first three-dimensional measurement of at least one location of a subject;
receiving sensor arrangement information comprising at least one second three-dimensional measurement of at least one sensor positioned on the subject at the at least one location; and
storing at least one association between the at least one first three-dimensional measurement and the at least one second three-dimensional measurement.

19. The computer program product of claim 18, wherein receiving the image information includes receiving image information depicting a human hand including one or more fingers and indicating one or more locations of the one or more fingers.

20. The computer program product of claim 18, the process further comprising:
storing, in a memory, image data based on the image information;
storing, in the memory, sensor arrangement data based on the sensor arrangement information; and
synchronizing the sensor arrangement data to the image data.

21. The computer program product of claim 20, wherein synchronizing the sensor arrangement data to the image data includes to generating one or more fabricated sensor readings.

22. The computer program product of claim 20, the process further comprising training a machine learning component with the image data, the sensor arrangement data, and the at least one association.

23. The computer program product of claim 20, the process further comprising testing a computer vision component with the image data, the sensor arrangement data, and the at least one association.

24. The computer program product of claim 18, the process further comprising:
receiving initial image information;
receiving initial sensor arrangement information; and
generating calibration data using the initial image information and the initial sensor arrangement information.

25. The computer program product of claim 18, wherein receiving the image information includes receiving image information from a three-dimensional camera.

* * * * *